United States Patent
Gao

(10) Patent No.: US 10,715,190 B2
(45) Date of Patent: Jul. 14, 2020

(54) WIRELESS HDMI TRANSMITTING DEVICE AND WIRELESS HDMI TRANSMITTING SYSTEM

(71) Applicant: SHENZHEN LENKENG TECHNOLOGY CO., LTD., Shenzhen, Guangdong Province (CN)

(72) Inventor: Binghai Gao, Shenzhen (CN)

(73) Assignee: SHENZHEN LENKENG TECHNOLOGY CO., LTD., Shenzhen, Guangdong Province (CN)

( * ) Notice: Subject to any disclaimer, the term of this patent is extended or adjusted under 35 U.S.C. 154(b) by 0 days.

(21) Appl. No.: 16/435,447

(22) Filed: Jun. 7, 2019

(65) Prior Publication Data

US 2020/0044672 A1 Feb. 6, 2020

(30) Foreign Application Priority Data

Aug. 1, 2018 (CN) .................. 2018 2 1235140 U

(51) Int. Cl.
| | |
|---|---|
| H04B 3/00 | (2006.01) |
| H04L 25/00 | (2006.01) |
| H04B 1/04 | (2006.01) |
| H04J 11/00 | (2006.01) |
| H04B 7/0413 | (2017.01) |

(52) U.S. Cl.
CPC .............. *H04B 1/04* (2013.01); *H04B 7/0413* (2013.01); *H04J 11/00* (2013.01)

(58) Field of Classification Search
CPC ......... H04B 1/04; H04B 7/0413; H04J 11/00; G05F 3/02; H04L 1/06; G09G 5/377; H04M 1/72527; A61N 1/3975; G06T 9/007

USPC .......................... 375/257, 260, 219, 220, 258
See application file for complete search history.

(56) References Cited

U.S. PATENT DOCUMENTS

| | | | | |
|---|---|---|---|---|
| 2007/0115797 A1* | 5/2007 | Reznic | .................... | G06T 9/007 370/203 |
| 2013/0065528 A1* | 3/2013 | Nagao | ............... | H04M 1/72527 455/41.2 |
| 2013/0304147 A1* | 11/2013 | Aoyama | ............... | A61N 1/3975 607/6 |
| 2016/0132284 A1* | 5/2016 | Amara Venkata | ..... | G09G 5/377 345/634 |
| 2018/0048509 A1* | 2/2018 | Huang | ....................... | H04L 1/06 |
| 2019/0312448 A1* | 10/2019 | Lim | .......................... | G05F 3/02 |

* cited by examiner

*Primary Examiner* — Phuong Phu
(74) *Attorney, Agent, or Firm* — Cheng-Ju Chiang

(57) ABSTRACT

A wireless High Definition Multimedia Interface (HDMI) transmitting device includes a wireless transmitting module and an HDMI interface configured to connect to a source device. The HDMI interface includes a power pin configured to receive power from the source device and a data pin configured to receive an HDMI data from the source device. The wireless transmitting module includes a power receiving contact connected to the power pin and a data receiving contact connected to the data pin. The wireless transmitting module receives the power through the power receiving contact and converts the HDMI data received by the data receiving contact into a wireless signal. Therefore, the wireless HDMI transmitting device may be powered in the absence of a power adapter, the space occupied by the wireless HDMI transmitting device is reduced, and a socket interface corresponding to the power adapter is not needed.

14 Claims, 3 Drawing Sheets

US 10,715,190 B2

WIRELESS HDMI TRANSMITTING DEVICE AND WIRELESS HDMI TRANSMITTING SYSTEM

CROSS REFERENCE TO RELATED APPLICATIONS

Pursuant to 35 U.S.C. § 119, this application claims foreign priority to Chinese Patent Application No. 201821235140.7 filed in Aug. 1, 2018, the contents of which, including any intervening amendments thereto, are incorporated herein by reference.

TECHNICAL FIELD

The present disclosure relates to a multimedia transmission technology, in particular to a wireless High Definition Multimedia Interface (HDMI) transmitting device and a wireless HDMI transmitting system.

BACKGROUND

Nowadays, wireless HDMI transmitting devices usually require a power adapter to supply power, which takes too much space of the wireless HDMI transmitting device and a socket interface is needed to connect with a plug of the power adapter. Thus, it is inconvenient to use. In addition, in order to save electrical energy, when the wireless HDMI transmitting device is not in use, users need to remove the wireless HDMI transmitting device from a signal source, and turn off the power adapter or unplug the plug of the power adapter, which is inconvenient.

SUMMARY

In order to overcome the deficiencies of the prior art, the present disclosure provides a wireless High Definition Multimedia Interface (HDMI) transmitting device and a wireless HDMI transmitting system, which can be powered in the absence of a power adapter.

The objective of the present disclosure is achieved by the following technical solutions:

The wireless HDMI transmitting device includes a wireless transmitting module and an HDMI interface configured to connect to a source device. The HDMI interface includes a power pin configured to receive power from the source device and a data pin configured to receive an HDMI data from the source device. The wireless transmitting module includes a power receiving contact connected to the power pin of the HDMI interface and a data receiving contact connected to the data pin of the HDMI interface. The wireless transmitting module receives power through the power receiving contact and converts the HDMI data received by the data receiving contact into a wireless signal.

Preferably, the wireless HDMI transmitting device further includes a power module connected between the power pin and the power receiving contact, and the power module is configured to process the power from the power pin to a processed power and transmit the processed power to the wireless transmitting module through the power receiving contact.

Preferably, the power pin includes a diode, an anode of the diode is electrically connected to the source device, and a cathode of the diode is electrically connected to the power module.

The power module includes a first power unit configured to generate a first voltage based on the power from the power pin, and transmit the first voltage to the wireless transmitting module through the power receiving contact.

Preferably, the power module includes a second power unit configured to generate a second voltage based on the power from the power pin, and input the second voltage to the wireless transmitting module through the power receiving contact.

Preferably, the power pin includes one pin with an output voltage of +5 V.

Preferably, the wireless transmitting module further includes a first processing unit, a modulation unit, and a first antenna. The first processing unit is configured to process the HDMI data to a processed data to be modulated, the modulation unit is configured to modulate the processed data to a modulated data, and the modulated data is converted into the wireless signal through the first antenna.

Preferably, the first processing unit includes a first processor having an OFDM-MIMO baseband algorithm.

Preferably, the first antenna is a broadband antenna with frequency band of 5.8 GHz, the modulating unit and the first antenna are configured to convert the processed data into a wireless signal with frequency band of 5.8 GHz.

Alternatively, the first antenna is a broadband antenna with frequency band of 60 GHz, the modulating unit and the first antenna are configured to convert the processed data into a wireless signal with frequency band of 60 GHz.

A wireless HDMI transmitting system includes the above-mentioned wireless HDMI transmitting device, and at least one receiving device configured to receive a wireless signal from the wireless HDMI transmitting device and convert the wireless signal into an audio-video data to be transmitted to and played by a playback device.

Compared with the prior art, the wireless HDMI transmitting system of the present disclosure has the beneficial effects that: the wireless transmitting module receives power from the source device through the power pin of the HDMI interface, and supplies the power to the corresponding circuit in the wireless transmitting module to allow the wireless transmitting module to be able to convert the HDMI data into the wireless signal. Therefore, the wireless HDMI transmitting system may be powered in the absence of a power adapter, on the one hand, the space occupied by the wireless HDMI transmitting device is reduced, on the other hand, a socket interface corresponding to the power adapter isn't needed, thus it is convenient to use the device. In addition, when the wireless HDMI transmitting device is not in use, the wireless HDMI transmitting device and the source device are disconnected to power off the wireless HDMI transmitting device.

The figure: 100, wireless HDMI transmitting device; 110, HDMI interface; 111, power pin; 112, data pin; 120, wireless transmitting module; 121, power receiving contact; 122, data receiving contact; 123, first processing unit; 124, modulation unit; 125, first antenna; 130, power module; 131, first power unit; 132, second power unit; 200, receiving device; 10, source device; 20, playback device.

DETAILED DESCRIPTION OF THE PREFERRED EMBODIMENTS

Several embodiments of the present disclosure will be described in detail with reference to the drawings. It should be noted that the figures are illustrative rather than limiting. The figures are not drawn to scale, do not illustrate every aspect of the described embodiments, and do not limit the scope of the present disclosure.

Figure 1:
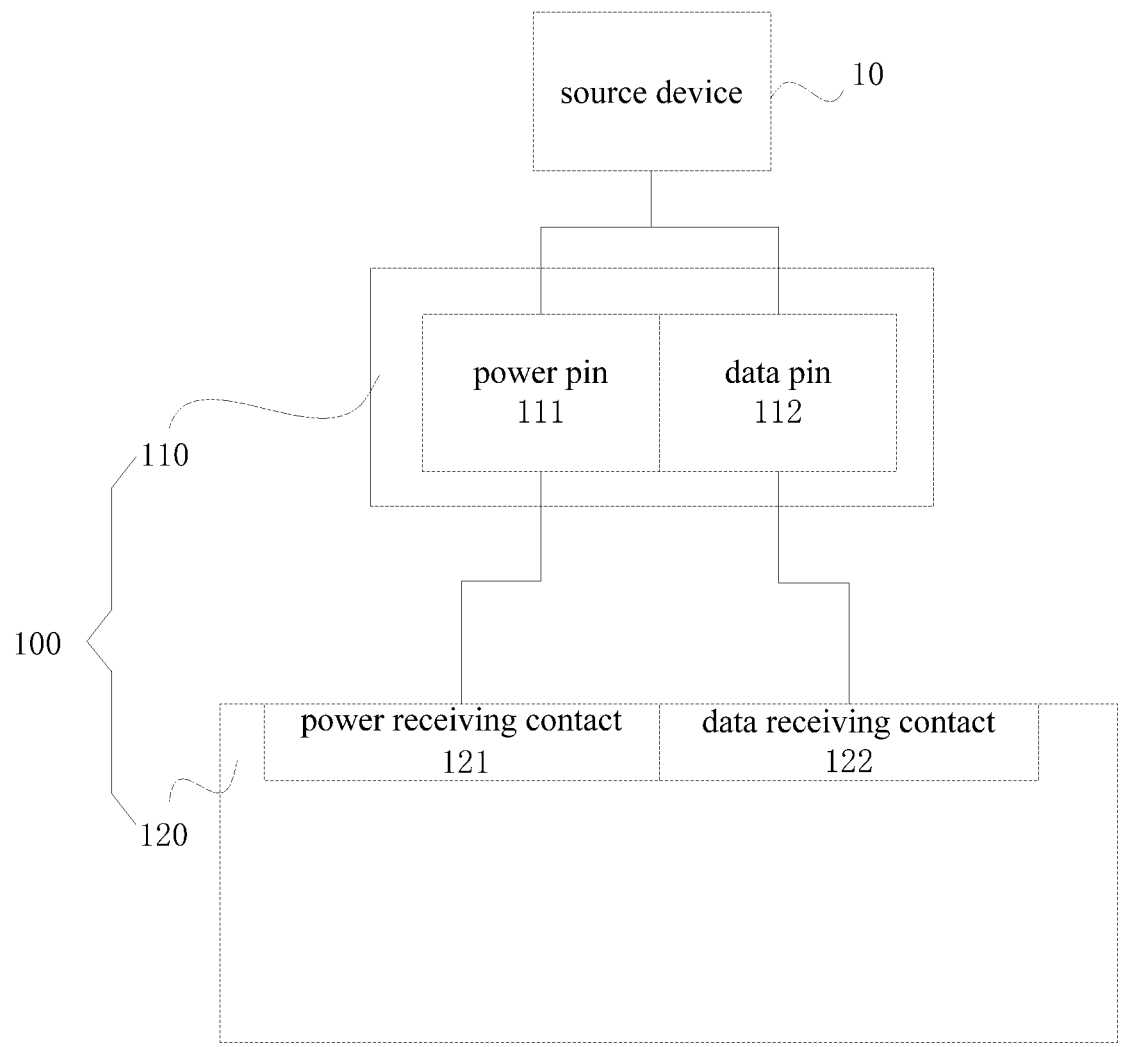
FIG. 1 is a block diagram of a wireless HDMI transmitting device according to an embodiment of the present disclosure.

FIG. 1 is a block diagram of a wireless High Definition Multimedia Interface (HDMI) transmitting device 100.

As shown in FIG. 1, the wireless HDMI transmitting device 100 includes an HDMI interface 110 and a wireless transmitting module 120. The HDMI interface 110 includes a power pin 111 and a data pin 112, and the wireless transmitting module 120 includes a power receiving contact 121 and a data receiving contact 122.

When the HDMI interface 110 is electrically connected to a source device 10, the power pin 111 receives power from the source device 10, and transmits the received power to the power receiving contact 121.

Figure 2:
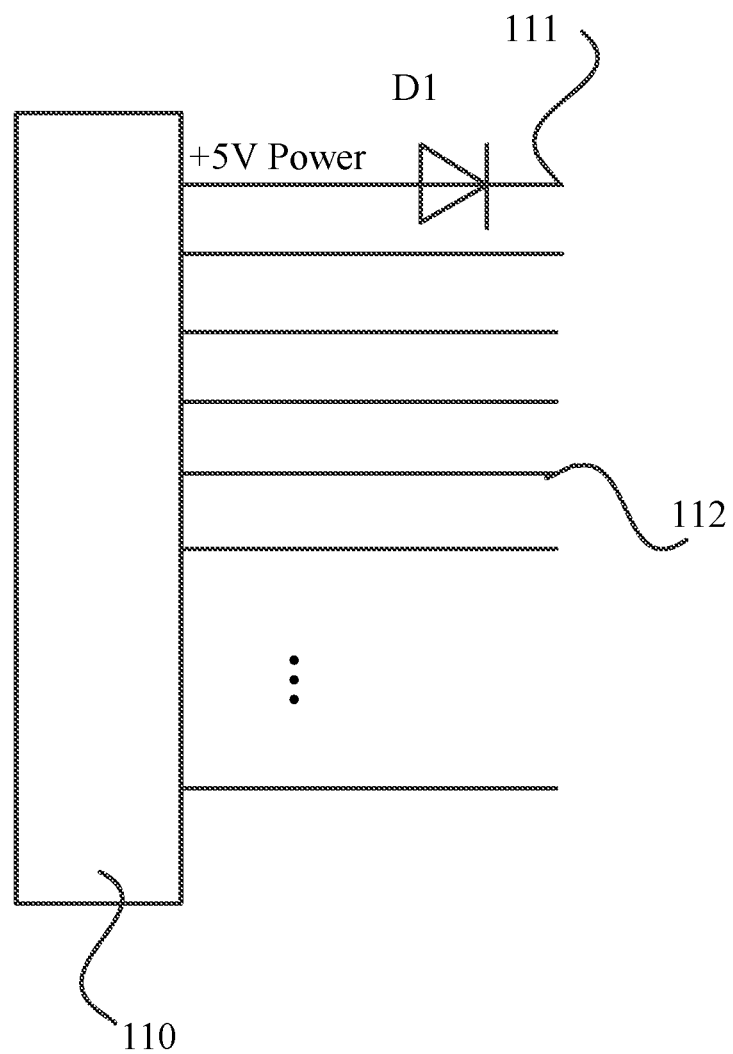
FIG. 2 shows an HDMI interface of FIG. 1.

In several embodiments, as shown in FIG. 2, the power pin 111 includes one pin with an output voltage of +5 V. Thus, when the power pin 111 is electrically connected to the source device 10, a voltage of 5 V may be provided by the power pin 111.

When the type of the HDMI interface 110 is type A, the HDMI interface 110 includes 19 pins and the eighteenth pin is the pin providing the output voltage of +5 V. When the type of the HDMI interface 110 is type B, the HDMI interface 110 includes 29 pins and the twenty-eighth pin is the pin providing the output voltage of +5 V. When the type of the HDMI interface 110 is mini, the HDMI interface 110 includes 19 pins and the eighteenth pin is the pin providing the output voltage of +5 V. When the type of the HDMI interface 110 is micro, the HDMI interface 110 includes 19 pins and the nineteenth pin is the pin providing the output voltage of +5 V.

In several embodiments, the power pin 111 includes a diode D1, an anode of the diode D1 is electrically connected to an interface of the source device 10, and a cathode of the diode D1 is electrically connected to the power receiving contact 121, in order to protect the interface of the source device 10.

When the HDMI interface 110 is electrically connected to the source device 10, an HDMI data is received by the data pin 112 from the source device 10, and sent to the data receiving contact 122. The definition of the data pin 112 of the HDMI interface 110 is well known by the skilled persons in the art, and is not described herein.

The wireless transmitting module 120 receives power via the power receiving contact 121 and converts the HDMI data received by the data receiving contact 122 into a wireless signal. In detail, the wireless transmitting module 120 receives the power from the source device 10 through the power pin 111 of the HDMI interface 110, and supplies the power to corresponding circuits in the wireless transmitting module 120 to allow the wireless transmitting module 120 to convert the HDMI data into the wireless signal.

In several embodiments, the wireless transmitting module 120 further includes a first processing unit 123, a modulation unit 124, and a first antenna 125. The first processing unit 123 is configured to convert the HDMI data to a processed data to be modulated.

In several embodiments, the first processing unit 123 includes a first processor having an Orthogonal Frequency Division Multiplexing (OFDM) and Multiple-Input Multiple-Output (MIMO) baseband algorithm.

In the OFDM-MIMO technology, a plurality of sets of transmitting antennas and a plurality of sets of receiving antennas are used, which realizes spatial diversity effects. In addition, a plurality of spatial channels provided by the plurality of sets of transmitting antennas and the plurality of sets of receiving antennas are hard to attenuate at the same time, and thus it can resolve the effects of signal attenuation during signal transmission. And bit streams are divided into a plurality of branches by serial-to-parallel transformation, and each branch needs to perform OFDM processing such as encoding, interleaving, quadrature amplitude modulation (QAM) mapping, insertion of pilot signals, Inverse Fast Fourier Transform (IFFT), cyclic prefix, and so on.

The OFDM-MIMO algorithm belongs to the prior art and will not be described herein.

The embodiment of the present disclosure realizes an ultra-high bandwidth modulation algorithm by using the OFDM-MIMO algorithm. The wireless HDMI transmitting device 100 may provide a relative high data transmission rate, and thus uncompressed and undelayed transmission of 4 k@30 Hz video can be acquired through the wireless HDMI transmitting device 100.

The modulation unit 124 is configured to modulate the processed data to a modulated data, and the modulated data is converted into a wireless signal through the first antenna 125.

In several embodiments, the first antenna 125 is a broadband antenna with frequency bands of 5.8 GHz, 60 GHz, etc., and the modulating unit 124 and the first antenna 125 are configured to convert the processed data into wireless signals with the frequency bands of 5.8 GHz, 60 GHz, and the like.

The antenna technology and the modulation technology of the radio frequency signal may be realized according to the prior art, and will not be described herein.

In several embodiments, the first antenna 125 may use a dual-polarized antenna, which solves an orientation problem of a millimeter wave transmission.

In the wireless HDMI transmitting device 100 provided by the embodiment of the present disclosure, the wireless transmitting module 120 receives the power from the source device 10 through the power pin 111 of the HDMI interface 110, and supplies the power to the corresponding circuit in the wireless transmitting module 120 to allow the wireless transmitting module 120 to convert the HDMI data into the wireless signal. Therefore, the wireless HDMI transmitting system may be powered in the absence of a power adapter, on the one hand, the space occupied by the wireless HDMI transmitting device 100 is reduced, on the other hand, a socket interface corresponding to the power adapter isn't needed, and thus it is convenient to use the device. In addition, when the wireless HDMI transmitting device 100 is not in use, the wireless HDMI transmitting device 100 and the source device 10 are disconnected to power off the wireless HDMI transmitting device 100.

A receiving device 200 receives the wireless signal from the wireless HDMI transmitting device 100 provided by the embodiment of the present disclosure, and demodulates and decodes the wireless signal to yield an audio-video data, and then the audio-video data is transmitted to and played by a playback device 20. The playback device 20 may be but not be limited to a display, a projector, and so on.

Figure 3:
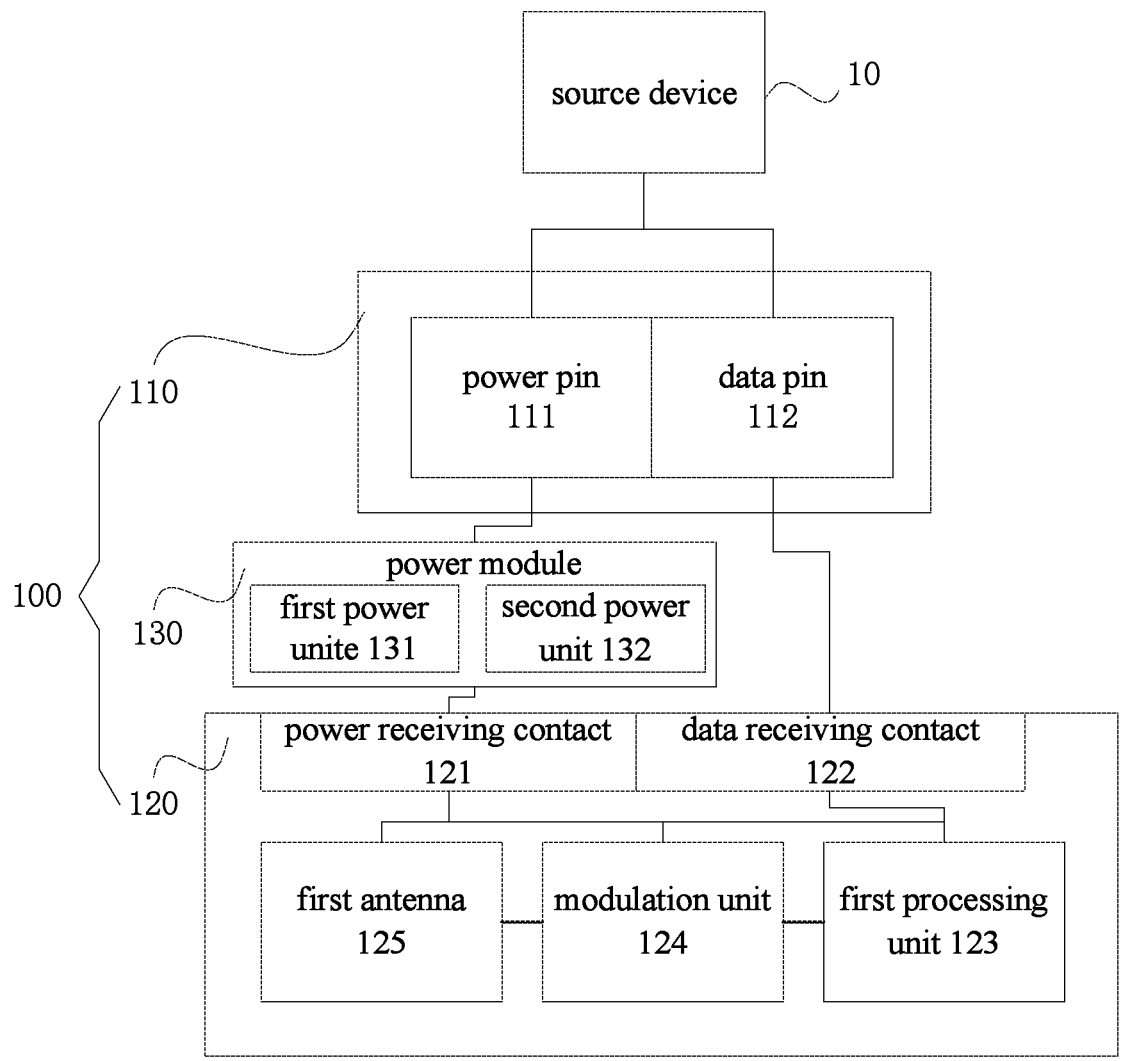
FIG. 3 is a block diagram of a wireless HDMI transmitting system according to an embodiment of the present disclosure.
Figure 3:
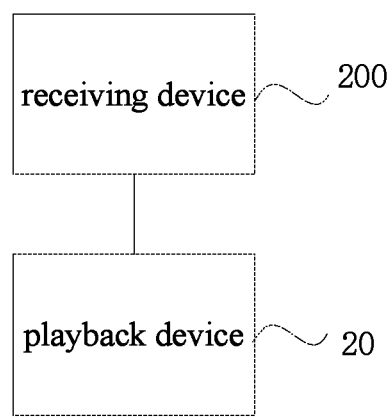

Referring also to FIG. 3, a wireless HDMI transmitting system includes the wireless HDMI transmitting device 100, and at least one receiving device 200. The receiving device 200 is configured to receive the wireless signal transmitted by the wireless HDMI transmitting device 100, convert the wireless signal into the audio-video data, and send the audio-video data to the playback device 20 for playing.

In the wireless HDMI transmitting system provided by the embodiment of the present invention, the wireless HDMI transmitting device 100 receives the power from the source device 10 through the power pin 111 of the HDMI interface 110, and supplies the power to the corresponding circuit in the wireless transmitting module 120 to allow the wireless transmitting module 120 to convert the HDMI data into the wireless signal. Therefore, the wireless HDMI transmitting system may be powered in the absence of a power adapter. On the one hand, the space occupied by the wireless HDMI transmitting device 100 is reduced, on the other hand, the socket interface corresponding to the power adapter isn't need, thus it is convenient to use the device. In addition, when the wireless HDMI transmitting device 100 is not in use, the wireless HDMI transmitting device 100 and the source device 10 are disconnected to power off the wireless HDMI transmitting device 100.

As a preferred embodiment, as shown in FIG. 3, the wireless HDMI transmitting device 100 further includes a power module 130 which is connected between the power pin 111 and the power receiving contact 121. The power module 130 is configured to process the power from the power pin 111 to a processed power, and transmit the processed power to the wireless transmitting module 120 through the power receiving contact 121.

A voltage provided by a corresponding pin of the power pin 111 may not be compatible with a voltage required by the wireless transmitting module 120, for example, the voltage provided by the corresponding pin of the power pin 111 is 5 V, and the voltage required by the first processing unit 123 in the wireless transmitting module 120 is 3.3 V, the power module 130 is configured to convert the power of 5 V received from the power pin 111 into the power of 3.3 V, and transmit the power of 3.3 V to the wireless transmitting module 120 through the power receiving contact 121.

In several embodiments, the power module 130 includes a first power unit 131, and a Direct Current (DC)-DC conversion circuit is applied in the first power unit 131. The first power unit 131 is configured to generate a first voltage based on the power from the power pin 111, and transmit the first voltage to the wireless transmitting module 120 through the power receiving contact 121. In this embodiment, the first voltage is between 3 V and 4 V.

In several embodiments, the power module 130 further includes a second power unit 132, and the DC-DC conversion circuit is applied in the second power unit 132. The second power unit 132 is configured to generate a second voltage based on the power from the power pin 111, and transmit the second voltage to the wireless transmitting module 120 through the power receiving contact 121. In this embodiment, the second voltage is between 1 V and 2.5 V, and the second voltage is supplied to corresponding components in the wireless transmitting module 120 which require the voltage between 1 V and 2.5 V.

In several embodiments, the power module 130 further cuts off the power provided to the corresponding components when the corresponding components are in idle state.

In several embodiments, the power pin 111 includes the diode D1, the anode of the diode D1 is electrically connected to the interface of the source device 10, and the cathode of the diode D1 is electrically connected to the power module 130, in order to protect the interface of the source device 10.

The above embodiments are only the preferred embodiments of the present invention, and do not limit the scope of the present invention. A person skilled in the art may make various other corresponding changes and deformations based on the described technical solutions and concepts. And all such changes and deformations shall also fall within the scope of the present invention.

What is claimed is:

1. A wireless high definition multimedia interface (HDMI) transmitting device, comprising:
   an HDMI interface configured to connect to a source device, the HDMI interface comprising a power pin configured to receive power from the source device and a data pin configured to receive an HDMI data from the source device;
   a wireless transmitting module comprising a power receiving contact connected to the power pin of the HDMI interface and a data receiving contact connected to the data pin of the HDMI interface, wherein the wireless transmitting module is configured to receive power from the HDMI interface through the power receiving contact and converts the HDMI data received by the data receiving contact into a wireless signal; and
   a power module connected between the power pin and the power receiving contact, wherein the power module is configured to process the power from the power pin to a processed power and transmit the processed power to the wireless transmitting module through the power receiving contact; wherein
   the power module comprises a first power unit configured to generate a first voltage based on the power from the power pin, and transmit the first voltage to the wireless transmitting module through the power receiving contact; and
   the power module further comprises a second power unit configured to generate a second voltage based on the power from the power pin, and transmit the second voltage to the wireless transmitting module through the power receiving contact.

2. The wireless HDMI transmitting device of claim 1, wherein the power pin comprises a diode, an anode of the diode is electrically connected to the source device, and a cathode of the diode is electrically connected to the power module.

3. The wireless HDMI transmitting device of claim 1, wherein the power pin comprises one pin with an output voltage of +5 V.

4. The wireless HDMI transmitting device of claim 1, wherein the wireless transmitting module further includes a first processing unit, a modulation unit, and a first antenna; the first processing unit is configured to process the HDMI data to a processed data to be modulated, the modulation unit is configured to modulate the processed data to a modulated data, and the modulated data is converted into the wireless signal through the first antenna.

5. The wireless HDMI transmitting device of claim 4, wherein the first processing unit comprises a first processor having an OFDM-MIMO baseband algorithm.

6. The wireless HDMI transmitting device of claim 5, wherein the first antenna is a broadband antenna with frequency band of 5.8 GHz, the modulating unit and the first antenna are configured to convert the processed data into a wireless signal with frequency band of 5.8 GHz.

7. The wireless HDMI transmitting device of claim 5, wherein the first antenna is a broadband antenna with frequency band of 60 GHz, the modulating unit and the first antenna are configured to convert the processed data into a wireless signal with frequency band of 60 GHz.

8. A wireless high definition multimedia interface (HDMI) transmitting system, comprising:
- a wireless HDMI transmitting device comprising a wireless transmitting module, an HDMI interface configured to connect to a source device, and a power module connected between the power pin and the power receiving contact; and
- at least one receiving device configured to receive a wireless signal from the wireless HDMI transmitting device and convert the wireless signal into an audio-video data to be transmitted to and played by a playback device;
  - wherein the HDMI interface comprises a power pin configured to receive power from the source device and a data pin configured to receive an HDMI data from the source device, and the wireless transmitting module comprises a power receiving contact connected to the power pin of the HDMI interface and a data receiving contact connected to the data pin of the HDMI interface; wherein the wireless transmitting module is configured to receive power through the power receiving contact and converts the HDMI data received by the data receiving contact into the wireless signal to be sent to the receiving device, and the power module is configured to process the power from the power pin to a processed power and transmit the processed power to the wireless transmitting module through the power receiving contact; wherein
  - the power module comprises a first power unit configured to generate a first voltage based on the power from the power pin, and transmit the first voltage to the wireless transmitting module through the power receiving contact; and
  - the power module further comprises a second power unit configured to generate a second voltage based on the power from the power pin, and transmit the second voltage to the wireless transmitting module through the power receiving contact.

9. The wireless HDMI transmitting system of claim 8, wherein the power pin comprises a diode, an anode of the diode is electrically connected to the source device, and a cathode of the diode is electrically connected to the power module.

10. The wireless HDMI transmitting system of claim 8, wherein the power pin comprises one pin with an output voltage of +5 V.

11. The wireless HDMI transmitting system of claim 8, wherein the wireless transmitting module further includes a first processing unit, a modulation unit, and a first antenna; the first processing unit is configured to process the HDMI data to a processed data to be modulated, the modulation unit is configured to modulate the processed data to a modulated data, and the modulated data is converted into the wireless signal through the first antenna.

12. The wireless HDMI transmitting system of claim 11, wherein the first processing unit comprises a first processor having an OFDM-MIMO baseband algorithm.

13. The wireless HDMI transmitting system of claim 12, wherein the first antenna is a broadband antenna with frequency band of 5.8 GHz, the modulating unit and the first antenna are configured to convert the processed data into a wireless signal with frequency band of 5.8 GHz.

14. The wireless HDMI transmitting system of claim 12, wherein the first antenna is a broadband antenna with frequency band of 60 GHz, the modulating unit and the first antenna are configured to convert the processed data into a wireless signal with frequency band of 60 GHz.

* * * * *